Figure 1:
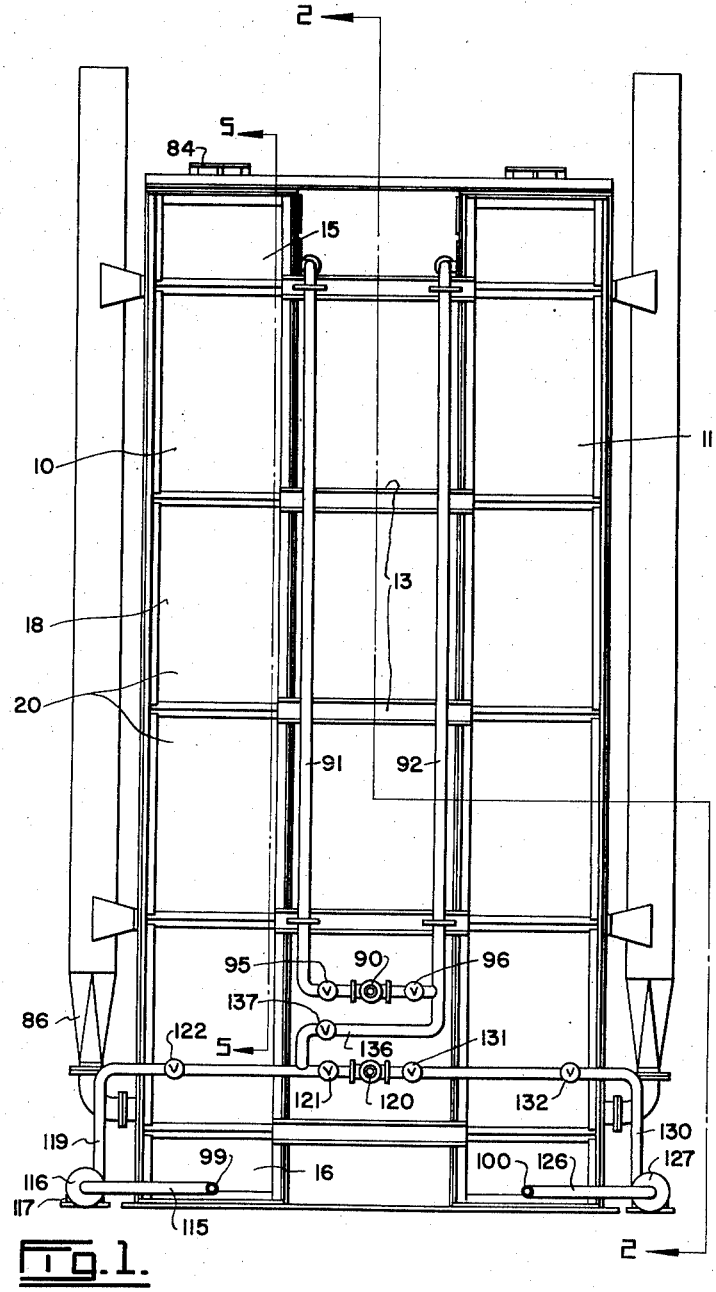

INVENTORS
ROBERT H. WRIGHT
RONALD W. KLINCK
BY
Fetherstonhaugh & Co.
ATTORNEYS

Oct. 28, 1958   R. H. WRIGHT ET AL   2,858,119
GAS-LIQUID REACTOR

Filed July 1, 1955   6 Sheets-Sheet 2

INVENTORS
ROBERT H. WRIGHT
RONALD W. KLINCK
BY
Fetherstonhaugh & Co.
ATTORNEYS

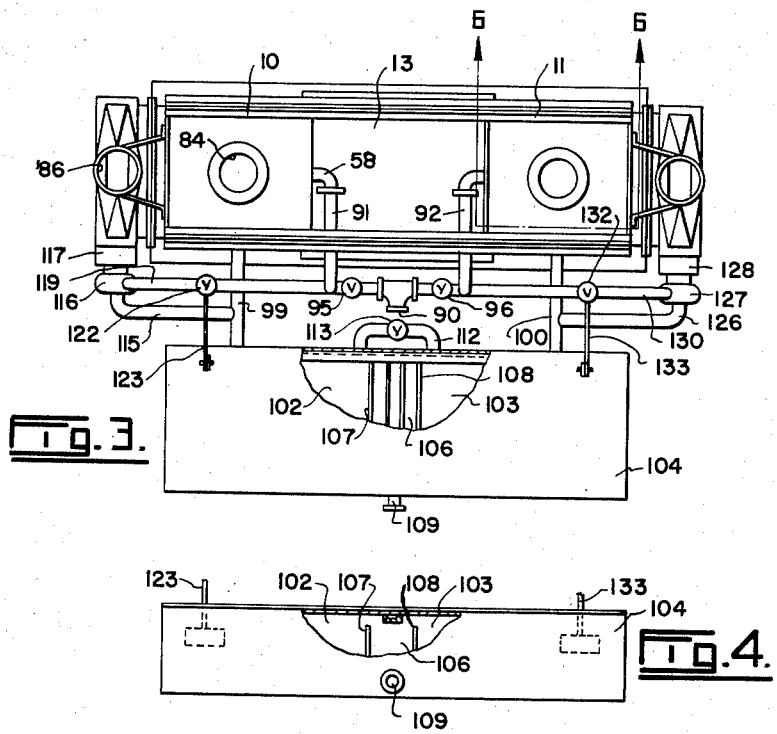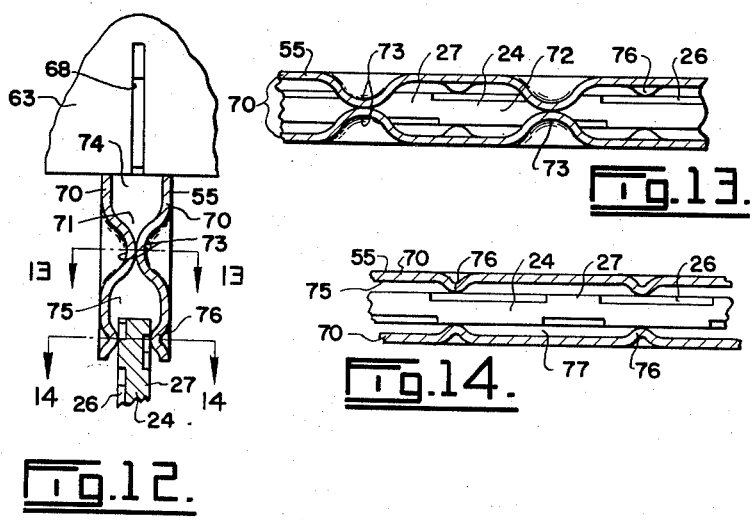

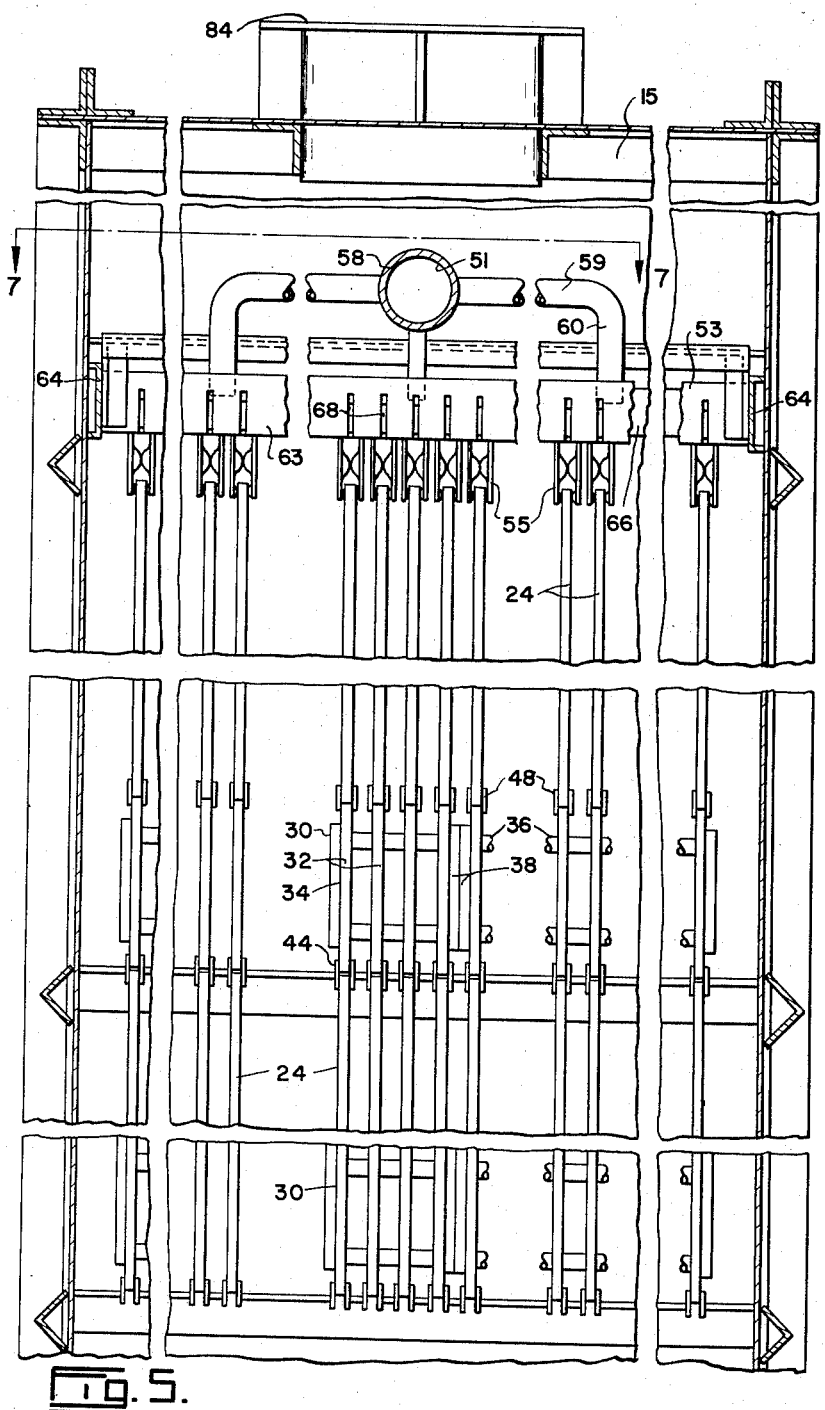

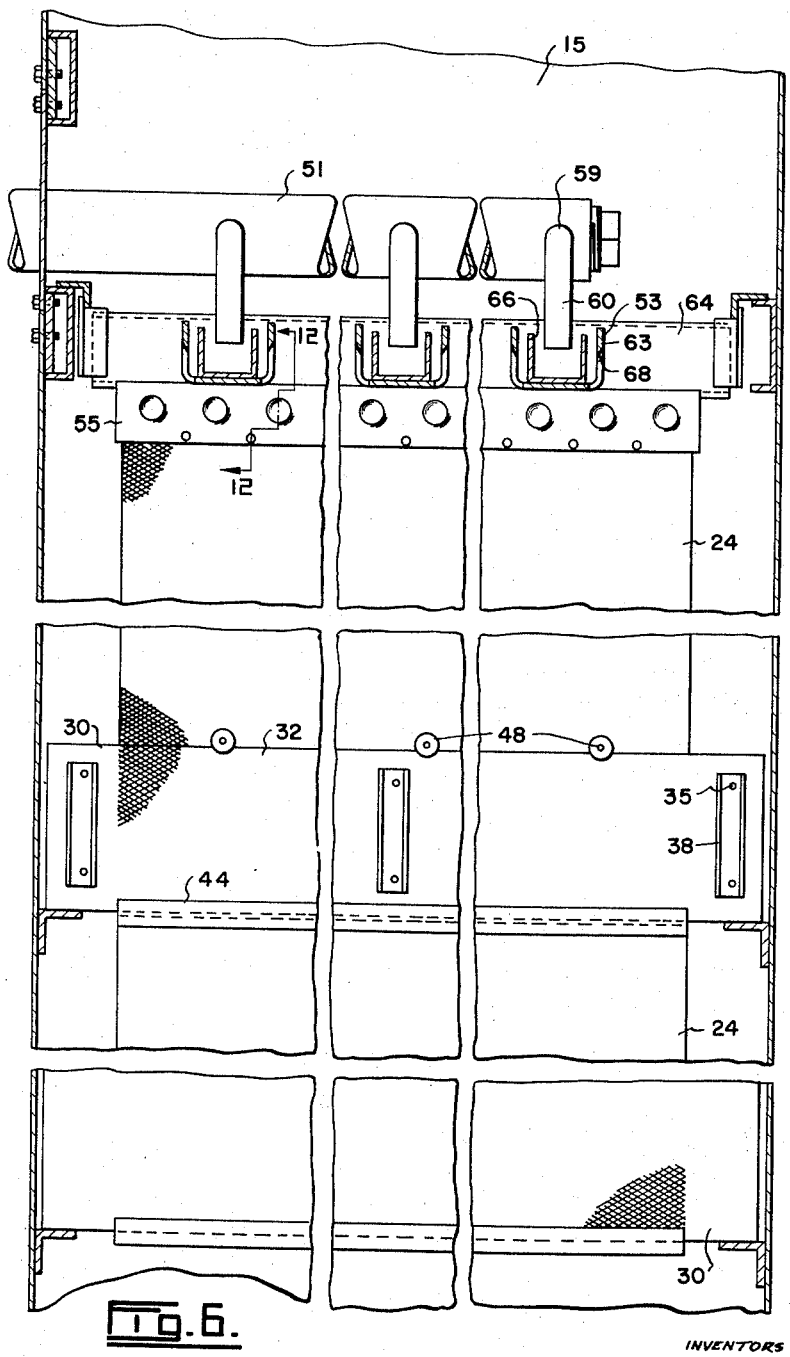

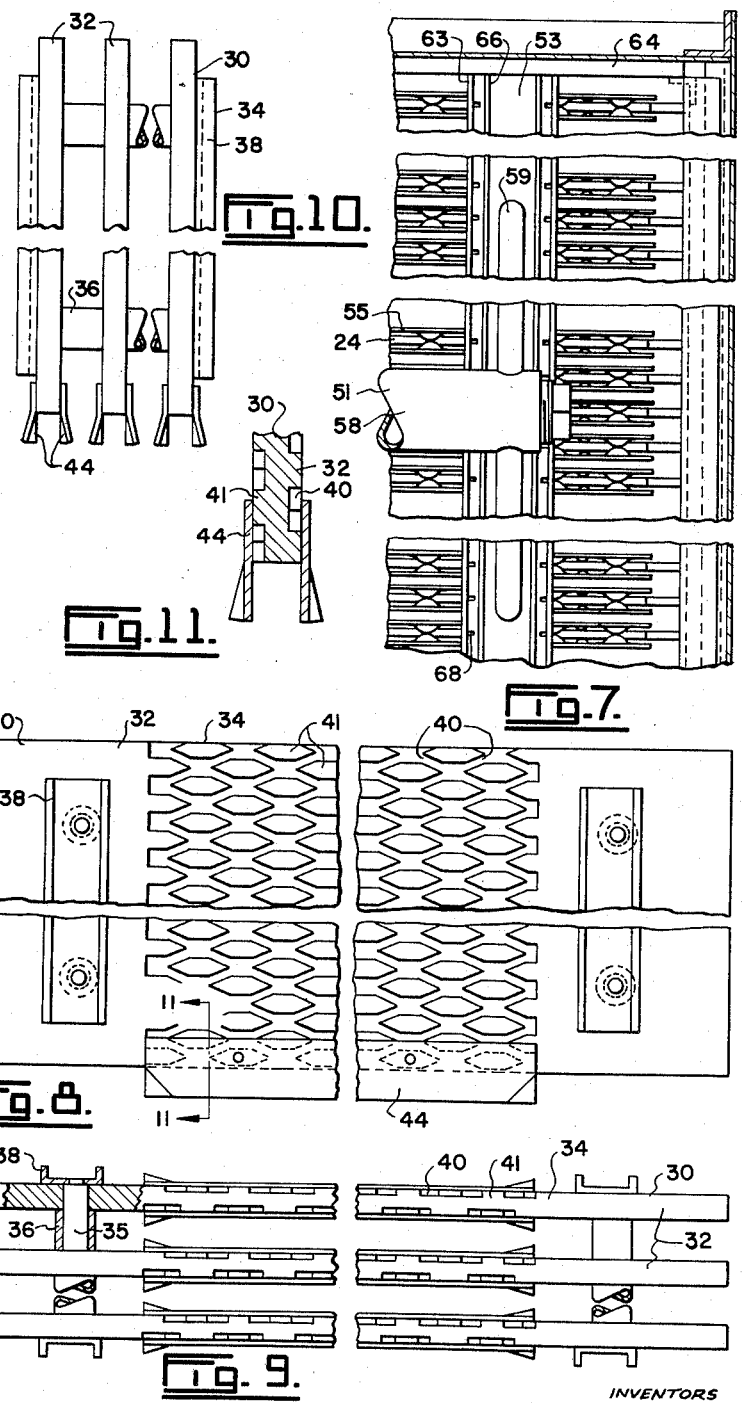

ant_offices_United States Patent Office 2,858,119
Patented Oct. 28, 1958

2,858,119

GAS-LIQUID REACTOR

Robert H. Wright and Ronald W. Klinck, Vancouver, British Columbia, Canada, assignors to British Columbia Research Council, Vancouver, British Columbia, Canada Application July 1, 1955, Serial No. 519,594

14 Claims. (Cl. 261—20)

This invention relates to a gas-liquid reactor in which an oxygen-containing gas, such as air, is brought into contact with a liquid, such as black liquor, for a comparatively long time.

The liberation of malodorous substances perceptible in small concentrations in air, specifically, derivatives of hydrogen sulfide, organic mercaptans, and organic sulfides, has long been regarded at one of the pricipal defects of the sulphate or kraft process for making wook pulp. As a result of repeated protests from people living in the vicinity of such pulp mills, a great deal of scientific investigation has been carried on from time to time in many countries, notwithstanding which pulp mills using the kraft process are still a course of objectionable odors.

The difficulties in eliminating the odor are due to two principal factors. First, the malodorous substances are perceptible when mixed with relatively enormous amounts of air and hence any system of odor reduction must effect a practically complete removal or destruction of these substances. Second, the malodorous effluents are liberated at several stages in the process and often at widely separated points in the plant.

The three principal points of odor release in kraft mills, although odors escape from other points as well, are as follows:

(1) The gases and vapors released from the digesters in which the wood chips are cooked with the appropriate pulping chemicals.

(2) The multiple effect and direct contact evaporators in which the used cooking liquor or "black liquor" is concentrated by evaporation prior to being burned for the recovery of the pulping chemicals.

(3) The furnace in which the concentrated black liquor is burned.

It has already been established that oxidation of black liquor prior to its evaporation and combustion serves to reduce materially the amount of malodorous substances released in the evaporation and burning operations. By black liquor oxidation we mean a process in which certain constitutents of the black liquor are oxidized by oxygen derived from air or other oxygen-containing gas and thereby chemically transformed into products which are less volatile or do not give rise to noisome or foul odors. Oxidation of black liquor is described by Bergstrom and Trobeck in a paper entitled "Investigations of Black Liquor" published by Svensk Papperstidn, vol. 42, pages 554–557, 1939, and later in Canadian Patents 466,610 and 481,587 which issued on July 18, 1950, and March 11, 1952, respectively; and we, of course, realize that it is not broadly novel to oxidize black liquor in an effort to prevent emission of bad odors and to reduce sulphur losses during subsequent processing of the liquor.

This invention pertains particularly to apparatus for carrying out the oxidation in a very efficient and economical manner. It is particularly designed for oxidizing black liquor and non-condensible and malodorous gases and it is so described herein, but it is to be understood that other liquids may be brought into contact with gas or gases therein. In this apparatus, the black liquor is caused to flow in a thin film in the same direction as and in intimate contact with a stream of an oxygen-containing gas, such as air. Foul gases from the pulp process may be mixed with the oxygen-containing gases in order that the malodorous compounds thereof may be absorbed into the liquor. The liquor trickles down substantially parallel vertical plates of suitable material, such as asbestos-cement, and the gas flows along the plates concurrently with the direction of liquor flow. The plates are spaced apart slightly to allow the gas to flow therebetween in close contact with the liquor. The main surfaces of the plates over which the liquor flows are provided with raised and depressed portions calculated to slow the flow of liquor down the plates and assure good contact between the gas and liquor. As air appears at the moment to be the most practical oxygen-containing gas for this purpose, the following description will refer only to air for the sake of convenience. However, it is to be understood that any oxygen-containing gas which will not otherwise interfere with the process may be used.

In order that black liquor may be satisfactorily oxidized, it is not enough that air and black liquor be brought in contact momentarily. A certain time of contact which is of the order of some minutes is required. For example, a time of three minutes has been found to be satisfactory. If black liquor flows unimpeded down a smooth plate, the length or height of the plate must be very great if sufficient time of contact is to be secured. If the surface bears a suitable imprint, the rate of flow is reduced and hence a sufficient time of contact can be achieved with a plate having a shorter length or lessened height. The plates may be formed of asbestos-cement, steel or other suitable material. The concurrent flow of black liquor and air takes place on both sides of the plate, so that both sides thereof should be provided with the above-mentioned raised and depressed portions.

The air used to oxidize the black liquor may to some extent become contaminated by malodorous material in the black liquor. However, with the concurrent flow and time lapse which we have suggested, the air leaving the oxidation unit shows little contamination, since malodorous material, which has ben liberated from the fresh black liquor entering the top of the oxidation unit and taken up by air entering at the top, is given ample opportunity during the concurrent flow to be re-absorbed by the black liquor near the bottom of the unit and oxidized in the liquor after the re-absorption. Furthermore, malodorous gases from the pulp process may be mixed with an excess of air before the latter enters the unit. The malodorous compounds of these gases are absorbed into the liquor and fixed therein by oxidation to less volatile substances.

One form of gas-liquid reactor according to the present invention includes a pair of vertical towers, each containing a plurality of units of spaced plates arranged vertically, and means at the top of each tower for distributing a liquid over both major surfaces of the plates in said tower. The treated liquor is removed from the bottoms of the towers. The system for supplying the liquor to the towers is such that they may operate in parallel or in series. The oxidizing gas with or without the malodorous gases, is directed to the tops of the towers and removed from the bottom thereof. While two or more towers may be used for structural and economic reasons, a single tower will operate quite satisfactorily and, therefore, the invention contemplates the use of one or more towers.

Figure 15:
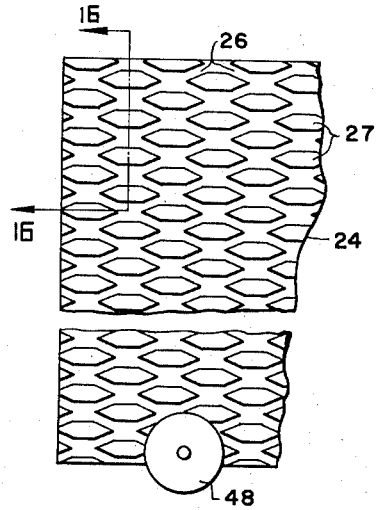
Figure 16:
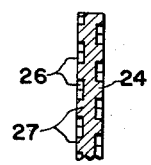
Figure 2:
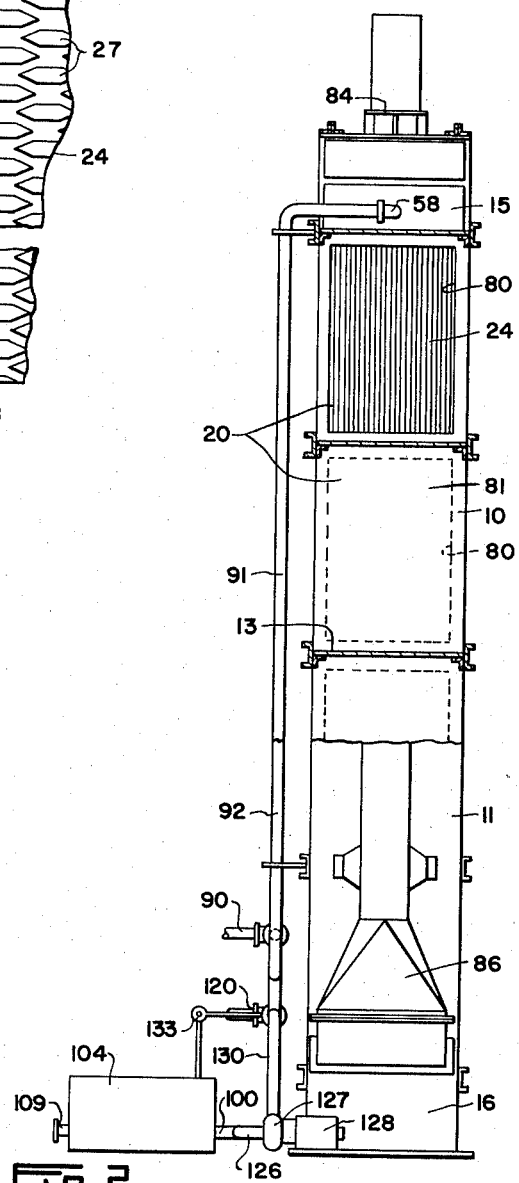

An example of this invention is illustrated in the accompanying drawings, in which, Figure 1 is an elevation of a two-tower reactor, Figure 2 is a partial elevation and section taken on the line 2—2 of Figure 1, Figure 3 is a plan view of the reactor, Figure 4 is an elevation of a sump associated with the towers and which is also shown in Figures 2 and 3, but is omitted from Figure 1, Figure 5 is an enlarged fragmentary vertical section taken on the line 5—5 of Figure 1, Figure 6 is an enlarged fragmentary vertical section taken on the line 6—6 of Figure 3, Figure 7 is a horizontal section taken on the line 7—7 of Figure 5, Figure 8 is an enlarged side elevation of a holder or connector for the plates in the towers, Figure 9 is a plan view of the holder or connector of Figure 8, Figure 10 is an end elevation of the holder or connector of Figure 8, Figure 11 is an enlarged fragmentary section taken on the line 11—11 of Figure 8, Figure 12 is an enlarged vertical section taken on the line 12—12 of Figure 6, Figure 13 is a horizontal section taken on the line 13—13 of Figure 12, Figure 14 is a horizontal section taken on the line 14—14 of Figure 12, Figure 15 is a reduced elevation of a portion of one type of plate that may be used in the towers, and Figure 16 is a section taken on the line 16—16 of Figure 15.

Referring to the drawings, this reactor includes a pair of towers 10 and 11 confronting each other across a plurality of common access galleries 13. While two towers have been shown, it will be understood that there may be only one tower or more than two, if desired. As the towers are similar in construction, only one will be described in detail, namely tower 10. The tower has a distribution chamber 15 at its upper end, and a separation chamber 16 at its lower end. The space 18 between these chambers is known as the column.

The column is divided into a desired number of cubicles 20, there being four of these cubicles in this example. In each cubicle 20 there is a bank of spaced vertical plates 24 formed of any suitable non-corrosive material, such as asbestos-cement. The two major surfaces of each plate are roughened by depressions and protuberances formed therein in any desired manner. Figures 15 and 16 illustrate a plate having channels 26 formed in the major surfaces thereof, said channels preferably being arranged to extend diagonally of the plate to form therebetween substantially diamond-shaped islands or protuberances 27.

The plates 24 are preferably removably mounted in each tower cubicle 20, and the plates of each cubicle are aligned vertically with plates in the other cubicles. Figures 5 and 6 illustrate the preferred mechanism for mounting and aligning these plates.

A holder 30 is mounted at the bottom of each tower cubicle 20, see Figures 5, 6 and 8 to 11. Each holder comprises a plurality of spaced vertical webs 32 standing on edge and preferably formed of the same material as the plates 24, which in this case, is asbestos-cement. For the sake of convenience, these webs are interconnected in sections 34, the webs of each section being connected by rods 35 extending through said webs, and the latter are separated by spacers 36 on the rods. Channels 38 on the outermost webs of each section act as separators between the sections themselves. Although the major surfaces of each web 32 may be plain, it is preferable to form said surfaces with depressions or protuberances in the same manner as the plate. For example, each surface may be formed with diagonally-extending and criss-crossing channels 40 which form therebetween diamond-shaped islands or protuberances 41. Spaced guide strips 44 project downwardly from each side of each web below the lower edge thereof, see Figures 8, 10 and 11. The latter Figure shows how these guide strips overlap the channels 40 at the lower edge of the web so that in effect these channels open outwardly from said edge beneath the strips.

The lower edge of each plate 24 rests upon the upper edge of a web 32 at the bottom of the cubicle in which said plate is located. Suitable means is provided for maintaining the plate and web in alignment while permitting the plate to be moved on to and off the web in the plane of the latter. For this purpose, each plate 24 may be provided with a plurality of discs or rollers 48 on the opposite faces thereof and projecting downwardly below its lower edge. When the plate is in place in the tower, these discs overlap the faces of the web upon which the plate rests so that the latter cannot move across the web plane. On the other hand, these discs permit the plate to be slipped on and off the web in the plane thereof. During movement of the plate, it slides along the upper edge of the web, while the discs prevent relative lateral movement between these elements. If the plate tends to move laterally, it is retained by the discs which act as rotatable stops that keep friction to a minimum. If a plate rubs against a stop, the latter rotates. In all but the uppermost cubicle in the tower the upper edge of each plate 24 fits between the guide strips 44 of a holder web of the cubicle immediately above. The upper edges of the plates in the uppermost cubicle are slidably supported in a manner hereinafter described.

Primary, secondary and tertiary distributors 51, 53 and 55 are mounted in the distribution chamber 15 at the top of the tower. These distributors are designed to direct thin films of black liquor or other liquid down the major surfaces of the plates 24 of the uppermost cubicle.

The primary distributor 51 includes a central pipe 58 which extends out of the distributing chamber. This pipe has a plurality of spaced branches 59, each of which has a plurality of spaced down pipes 60.

Each secondary distributor 53 includes a plurality of spaced horizontal outer troughs 63 extending between beams 64 that are mounted in the tower. Each outer trough has an inner trough 66 therein and extending longitudinally thereof, the walls of the inner troughs being lower than those of the outer troughs, see Figure 6. There are a plurality of vertical spaced slots 68 in the side walls of each outer trough 63, said slots actually extending part way into the trough bottom, as shown in Figure 6. By referring to Figures 5 and 7 it will be seen that there is a slot 68 immediately above each plate 24, and that said plates extend transversely of the troughs.

The tertiary distributor 55 appears in Figures 5, 6 and 7 and is shown in enlarged form in Figures 12 to 14. Each tertiary distributor comprises a pair of elongated side plates 70 which extend parallel to each other. These plates are shaped inwardly towards each other substantially midway between their upper and lower edges to form a throat 71 extending longitudinally of the distributor. Pairs of opposed dimples 73 are pressed inwardly of these plates at the throat and secured together in any suitable manner, such as by welding. The connections between opposed dimples, see Figure 13, hold the plates together while leaving passages 72 between spaced pairs of dimples through which liquid may pass. The upper portions of each pair of plates 70 form a funnel 74 which leads down to the throat. The lower portions of the plates form a channel 75 into which the upper edge of a plate 24 in the uppermost tower cubicle extends. In order to keep the major surfaces of the plate 24 away from the inner surfaces of plates 70, the latter are formed near the lower edges thereof with a plurality of inwardly-extending dimples 76 forming channels 77 therebetween, see Figures 12 and 14, through which liquid may pass.

Referring to Figure 5 again, it will be seen that the upper edges of plates 24 in the uppermost cubicle of the tower slidably fit into the channels 75 of the tertiary distributors 55, the lower edges of said plates resting on the upper edges of webs 32 of the holder 30 at the bottom of said cubicle. Each plate 24 in the uppermost cubicle extends transversely beneath a plurality of troughs 63 of the secondary distributor, and it is held in line with a plurality of slots 68 in said troughs, see Figure 6. At the same time, each plate and its supporting web of a cubicle are held in alignment with a plate 24 and its web 32 of each of the other cubicles. The holders 30 form means for aligning the major surfaces of each plate with those of the other cubicles. Actually, the aligned surfaces of the plates and holder webs form flow surfaces extending from the top to the bottom of the tower. With this distributor arrangement, the primary distributor 51 supplies liquid to the troughs of the secondary distributor throughout the lengths thereof. It will be noted that each down pipe 60 extends a little into an inner trough 66, see Figure 6. Liquid directed into each inner trough spills over the upper edges of the walls thereof into the outer trough in which the former is located. This liquid passes through slots 68 into the tertiary distributors 55 which directs it on to the major surfaces of the plates 24. Any eddies or disturbances in the liquid are lost when it overflows from the inner troughs to the outer troughs.

As stated above, most plates 24 are slidably mounted in the holders 30 in the tower. The upper edges of the plates in the uppermost cubicle are slidably held in place by the channels 75 of the tertiary distributors. This makes it possible to remove and replace any plate without disturbing the others. For this purpose, each tower cubicle is formed with a large opening 80 in the side thereof which is normally closed by a cover plate or door 81. The cover plate of the uppermost cubicle has been removed in Figure 2 in order to expose plates 24 in said cubicle. The opening 80 is of such size as to expose each of the plates, and the latter may be withdrawn through said opening. It will be noted that there is a gallery 13 extending between the towers 10 and 11 at the bottom of each cubicle 20. These galleries not only make it easy to gain access to the cubicles, but they serve to brace the towers so that each helps to support the other.

Oxygen-containing gas, such as air, is directed into the top of the distribution chamber 15 of the tower through an entrance 84, and this gas is removed from the bottom of the tower 16 through a duct 86 connected to the side thereof. Suitable means, not shown, is provided for moving the gas downwardly through the tower at a desired rate of flow. This may be a blower in the pipe leading to entrance 84, or it may be a suction fan in or connected to duct 86.

While the towers 10 and 11 normally operate in parallel with reference to the liquid flowing therethrough, it is advantageous to hook them up so that they may be operated in series, if it is so desired. Liquid is directed into the system through an inlet 90, said inlet being connected by pipes 91 and 92 to the central pipes 58 of the primary distributors of the towers 10 and 11, respectively. Valves 95 and 96 are provided in pipes 91 and 92. Pipes 99 and 100 extend outwardly from the separation chambers 16 of the towers to compartments 102 and 103 of a sump tank 104. The compartments are separated from a central compartment 106 in the tank by walls 107 and 108 which do not quite extend up to the top of the sump tank, see Figure 4. An outlet 109 is provided at the bottom of the central compartment. If desired, compartments 102 and 103 may be interconnected by a pipe 112 having a control valve 113 therein.

Pipe 99 is connected by a pipe 115 to a pump 116 which is driven in any suitable manner, such as by means of an electric motor 117. A pipe 119 extends from the pressure side of the pump to an outlet 120. A control valve 121 is provided in pipe 119, and, if desired, another valve 122 may be provided in said pipe, said valve being controlled by a float mechanism generally designated by the numeral 123 extending into compartment 102 of the sump tank. Similarly, a pipe 126 connects pipe 100 to a pump 127 which is driven by a motor 128. This pump is connected by a pipe 130 to the outlet 120. Pipe 130 has a control valve 131 therein and, if desired, another valve 132 which is operated by a float mechanism generally designated by the numeral 133 extending into the compartment 103 of the sump tank.

A change-over pipe 136 having a valve 137 therein extends from pipe 119 to pipe 92. This pipe is used when it is desired to operate the towers in series.

The operation of this gas-liquid reactor is as follows:

Valves 95 and 96 are normally open and valve 137 closed so that liquid, in this example, black liquor, is directed by pipes 91 and 92 to the primary distributors 51 at the tops of the towers 10 and 11. The liquid is directed by down pipes 60 into inner troughs 66 of the secondary distributor 53. Liquid spilling over the upper edges of the troughs falls into outer troughs 63, whence it is directed through slots 68 into the funnels 74 of the tertiary distributors 55. The latter direct liquid on to the major surfaces of plates 24 in the uppermost cubicle 20 at the upper edges thereof. As previously stated, the major surfaces of the plates and of the webs 32 of holders 30 form flow surfaces extending from the tops to the bottoms of the towers. The channels and protuberances of these surfaces help to keep the liquid distributed laterally thereof, and they slow down the flow of liquid in order to keep it as long as possible in contact with gas flowing concurrently therewith between the plates and over the major surfaces thereof. This gas is directed into the towers through entrances 84, and it comes from any desired point in the pulp process. For example, it may be non-condensable gases from the digester venting, relieving and blowing operations. These gases are preferably mixed with an excess of air before entering the towers. The gas reaching the bottoms of the towers is directed out thereof by ducts 86.

The malodorous compounds of the gas are absorbed into liquor at the tops of the towers, and are fixed therein by oxidation to less volatile substances. In addition to this, the malodorous materials normally found in black liquor are oxidized therein.

Liquid passes out of the bottom of tower 10 through pipe 99. The float mechanism 123 operates valve 122 to keep a desired amount of liquid in compartment 102 of the sump tank 104. This maintains a constant supply of liquid for pump 116, and the latter directs the liquid through pipe 119 to outlet 121, valve 120 being open at this time. Similarly, liquid from tower 11 passes through pipe 100 into the sump compartment 103, and this is maintained at a constant level by float mechanism 133 operating valve 132. Pump 127 directs liquid through pipe 130 to outlet 120, valve 131 being open at this time.

If desired, one pump may be kept in reserve, in which case, valve 113 is open so that compartments 102 and 103 are in communication through pipe 112. If, for example, pump 127 is stopped, valve 131 would be closed. In this case, liquid from tower 11 passes through pipe 100, compartment 103, pipe 112, and into compartment 102 from whence it is drawn by pump 116. Thus it is possible to keep the reactor going even if one of the pumps is out of commission.

As previously stated, the liquid systems of the towers may be operated in series. One way of doing this is to close valves 96, 121 and 113 and open valve 137 in the change-over pipe 136. Liquid entering the system through the inlet 90 passes along pipe 91 to the distributing apparatus of tower 10. After passing over the flow surfaces in this tower, the liquid is directed by pump 116 through pipes 119, 136 and 92 to the distributing apparatus of tower 11. After passing downwardly over the flow surfaces in this tower, the liquid is directed by pump 127 to the outlet 120.

The sump arrangement associated with the towers assures a supply of liquid for the pumps should the flow of liquid to the apparatus be stopped for any reason whatsoever. Another advantage of this apparatus is that if one tower has to be shut down, the other tower may be kept in operation so that the reactor continues at least at half capacity. For example, if it is desired to shut down tower 11, it is only necessary to keep valves 96, 131 and 137 closed. Liquid is then directed from inlet 90 through tower 10 and to the outlet 120.

What we claim as our invention is:

1. A gas-liquid reactor comprising a tower divided into a plurality of vertically arranged cubicles, a plurality of closely spaced parallel and independent plates of non-corrosive material individually removable and vertically arranged in each cubicle, a wall of each cubicle having an opening therein at the vertical edges of the plate of said cubicle, each opening being large enough to permit each individual plate of its cubicle to be removed without disturbing the other plates, a cover removably closing each cubicle opening, means supporting each plate in its cubicle and aligning the major surfaces of said plate with those of plates in each adjoining cubicle, said supporting and aligning means forming with the plates uninterrupted flow surfaces extending substantially from the top to the bottom of the tower, means at the top of the tower for flowing liquid directly on to and completely across the major surfaces at the upper edge of each of the upper most plates, whereby all the liquid trickles in thin films downwardly over the flow surfaces, means for directing liquid out of the lower end of the tower, means for directing gas into the top of the tower, said gas flowing downwardly between the plates over and concurrently with the liquid, and means for removing the gas from the tower bottom.

2. A liquid-gas reactor as claimed in claim 1 in which there is aligning means at the bottom of each cubicle for the plates therein, said aligning means comprising a plurality of vertical webs extending across the tower, means spacing the webs a little from each other, the lower edge of a plate in the cubicle removably resting on the upper edge of each web, and means for preventing each plate from shifting from the plane of its web.

3. A liquid-gas reactor as claimed in claim 2 including means at the lower edge of each web for overlapping the faces of the upper end of a plate in the cubicle immediately below.

4. A gas-liquid reactor comprising a tower divided into a plurality of vertically arranged cubicles, a plurality of closely spaced parallel supporting webs on edge mounted in and carried by each cubicle at the bottom thereof, said webs being formed of non-corrosive material and having vertical substantially parallel faces, an independent vertical plate of non-corrosive material removably standing on edge on the upper edge of each web, the major surfaces of each plate being aligned with the faces of its web, the plates in each cubicle below the uppermost one being positioned at the lower edges of the webs of the cubicle immediately above, means positioning each of the last-mentioned plates relative to the web above with the major surfaces of said plates aligned with the faces of said web, the major surfaces of the plates and the faces of the webs aligned therewith forming uninterrupted closely spaced flow surfaces extending substantially from the top to the bottom of the tower, means at the top of the tower for flowing liquid directly on to the major surfaces at the upper edge of each of the uppermost plates, whereby all the liquid trickles in thin films downwardly over the flow surfaces, means for directing liquid out of the lower end of the tower, means for directing gas into the top of the tower, said gas flowing downwardly between the plates over and concurrently with the liquid, and means for removing the gas from the tower bottom.

5. A liquid-gas reactor as claimed in claim 4 in which the flow surfaces formed by the plates and webs are roughened to delay the flow of liquid thereover.

6. A liquid-gas reactor as claimed in claim 4 in which a wall of each cubicle has an opening therein at the vertical edges of the plates of said cubicle, each opening being large enough to permit each individual plate of its cubicle to be removed without disturbing the other plates, and a cover removably closing each cubicle opening.

7. A liquid-gas reactor as claimed in claim 4 in which the webs in each cubicle are formed in a plurality of laterally-spaced units removably mounted in the tower.

8. A liquid-gas reactor as claimed in claim 4 including means where each plate stands on a web for preventing said plate from shifting from the plane of said web.

9. A liquid-gas reactor as claimed in claim 4 in which the means for flowing liquid directly on to the major surfaces at the upper edges of the uppermost plate comprises distributors extending along and overlapping the major surfaces at the upper edges of said plates, and means for directing liquid to each distributor throughout the length thereof; each distributor comprising a pair of side plates spaced apart at their upper edges to form a funnel for receiving liquid, said plates also being spaced apart at their lower edges to form a channel for receiving the upper edge of a flow plate, and means substantially midway between the upper and lower edges of the side plates and at spaced intervals throughout the length thereof for securing said plates together.

10. A liquid-gas reactor as claimed in claim 4 in which the means for flowing liquid directly on to the major surfaces at the upper edges of the uppermost plate comprises distributors extending along and overlapping the major surfaces at the upper edges of said plates, and means for directing liquid to each distributor through the length thereof; each distributor comprising a pair of side plates spaced apart at their upper edges to form a funnel for receiving liquid, said plates also being spaced apart at their lower edges to form a channel for receiving the upper edge of a flow plate, and including opposed dimples pressed inwardly of said plates substantially midway between the upper and lower edges thereof at spaced intervals throughout the length of the plates, said opposed dimples being secured to each other to retain the plates in spaced relationship.

11. A liquid-gas reactor as claimed in claim 4 in which the means for flowing liquid directly on to the major surfaces at the upper edges of the uppermost plates comprises a distributor including a plurality of spaced outer troughs extending transversely of said uppermost plates immediately above the upper edges thereof, each trough having vertical slots directly over each of the plates in its opposite side walls at the bottoms of the latter and extending laterally into the trough bottom, and means for directing liquid into the troughs.

12. A liquid-gas reactor comprising a pair of towers confronting each other; each tower being divided into a plurality of vertically arranged cubicles, a plurality of closely spaced parallel and independent plates of non-corrosive material individually removable and vertically arranged in each cubicle, a wall of each cubicle having an opening therein at the vertical edges of the plate of said cubicle, each opening being large enough to permit each individual plate of its cubicle to be removed without disturbing the other plates, a cover removably closing each cubicle opening, means supporting each plate in its cubicle and aligning the major surfaces of said plate with those of plates in each adjoining cubicle, said supporting and aligning means forming with the plates uninterrupted flow surfaces extending substantially from the top to the bottom of the tower, distributor means at the top of the tower for flowing liquid directly on to and completely across the major surfaces at the upper edge of each of the uppermost plates, whereby all the liquid trickles in thin films downwardly over the flow surfaces, means for directing liquid out of the lower end of the tower, means for directing gas into the top of the tower, said gas flowing downwardly between the plates over and concurrently with the liquid, and means for removing the gas from the tower bottom; means for directing liquid to the distributor means of both towers, the openings of the towers facing each other in pairs, and an access gallery extending between and secured to the towers beneath each pair of openings thereof.

13. A liquid-gas reactor comprising a pair of towers confronting each other; each tower being divided into a plurality of vertically arranged cubicles, a plurality of closely spaced parallel and independent plates of non-corrosive material individually removable and vertically arranged in each cubicle, a wall of each cubicle having an opening therein at the vertical edges of the plate of said cubicle, each opening being large enough to permit each individual plate of its cubicle to be removed without disturbing the other plates, a cover removably closing each cubicle opening, means supporting each plate in its cubicle and aligning the major surfaces of said plate with those of plates in each adjoining cubicle, said supporting and aligning means forming with the plates uninterrupted flow surfaces extending substantially from the top to the bottom of the tower, distributor means at the top of the tower for flowing liquid directly on to and completely across the major surfaces at the upper edge of each of the uppermost plates, whereby all the liquid trickles in thin films downwardly over the flow surfaces, means for directing liquid out of the lower end of the tower, means for directing gas into the top of the tower, said gas flowing downwardly between the plates over and concurrently with the liquid, and means for removing the gas from the tower bottom, and means for selectively directing liquid either to the distributor means of both towers or to the distributor means of one tower and from the bottom of the latter tower to the distributor means of the other tower.

14. A liquid-gas reactor comprising a tower divided into a plurality of vertically arranged cubicles, a plurality of closely spaced parallel plates of non-corrosive material removably and vertically arranged in each cubicle, means aligning the major surfaces of each plate with those of plates in the adjoining cubicles, said aligning means forming with the plates uninterrupted flow surfaces extending substantially from the top to the bottom of the tower, distributors extending along and overlapping the major surfaces of the uppermost plates at the upper edges thereof, means for directing liquid to each distributor throughout the length thereof, said distributors flowing liquid directly on to the major surfaces of the plates across the widths thereof, whereby all the liquid trickles in thin films downwardly over the flow surfaces; each distributor comprising a pair of side plates spaced apart at their upper edges to form a funnel for receiving liquid, said plates also being spaced apart at their lower edges to form a channel for receiving the upper edge of a flow plate, opposed dimples pressed inwardly of said plates substantially midway between the upper and lower edges thereof at spaced intervals throughout the length of the plates, said opposed dimples being secured to each other to retain the plates in spaced relationship; means for directing liquid out of the lower end of the tower, means for directing gas into the top of the tower, said gas flowing downwardly between the plates over and concurrently with the liquid, and means for removing the gas from the tower bottom.

References Cited in the file of this patent

UNITED STATES PATENTS

| | | |
|---|---|---|
| 292,491 | Isbell | Jan. 29, 1884 |
| 386,777 | Griesser | July 24, 1888 |
| 821,561 | Wheeler et al. | May 22, 1906 |
| 973,120 | Lloyd | Oct. 18, 1910 |
| 1,027,184 | Coffey | May 21, 1912 |
| 1,538,457 | Zoelly | May 19, 1925 |
| 2,228,128 | Schmalenbach | Jan. 7, 1941 |
| 2,347,757 | Thomas | May 2, 1944 |
| 2,661,197 | Norman | Dec. 1, 1953 |
| 2,713,476 | Steichen | July 19, 1955 |
| 2,732,190 | Mart | Jan. 24, 1956 |

FOREIGN PATENTS

| | | |
|---|---|---|
| 348,432 | France | Feb. 8, 1905 |
| 468,129 | Italy | Dec. 29, 1951 |
| 668,293 | Great Britain | Mar. 12, 1952 |
| 680,457 | Great Britain | Oct. 8, 1952 |
| 681,019 | Great Britain | Oct. 15, 1952 |
| 690,737 | Great Britain | Apr. 29, 1953 |
| 721,243 | Great Britain | Jan. 5, 1955 |